United States Patent [19]
Miyoshi et al.

[11] 3,864,293
[45] Feb. 4, 1975

[54] PHOTO-DEGRADABLE STYRENE RESIN COMPOSITION

[75] Inventors: Hiroshi Miyoshi, Takatsuki; Hirohumi Mori, Suita; Yoriko Tanoue, Suita; all of Japan

[73] Assignee: Sekisui Kagaku Kogyo Kabushiki Kaisha, Osaka, Japan

[22] Filed: Aug. 24, 1971

[21] Appl. No.: 174,557

[30] Foreign Application Priority Data
Aug. 25, 1970 Japan............................... 45-75053
Dec. 4, 1970 Japan............................. 45-107896
Dec. 28, 1970 Japan............................. 45-126946
Dec. 28, 1970 Japan............................. 45-126947

[52] U.S. Cl................ 260/23.7 R, 260/33.8 UA, 260/45.75 C, 260/45.75 R, 260/94.3, 260/94.7 D, 260/DIG. 43
[51] Int. Cl............................................. C08d 11/00
[58] Field of Search .. 260/93.5 A, 85.5 M, 45.75 R, 260/45.75 C, DIG. 43, 2.5, 23.7 R, 33.8 UA, 94.3, 94.7 D, DIG. 43

[56] References Cited
UNITED STATES PATENTS

| | | | |
|---|---|---|---|
| 2,248,512 | 7/1941 | Philip et al..................... | 260/93.5 A |
| 2,383,922 | 8/1945 | Soday............................ | 260/93.5 A |
| 2,549,538 | 4/1951 | Sparks et al.................. | 260/93.5 A |
| 2,615,860 | 10/1952 | Burgess....................... | 260/45.75 C |
| 2,676,927 | 4/1954 | McCurdy et al............... | 260/93.5 A |
| 2,778,741 | 1/1957 | Weber.......................... | 260/45.75 C |
| 2,790,734 | 4/1957 | Kuhn et al. .................. | 260/45.75 C |
| 3,300,462 | 1/1967 | Milan et al..................... | 260/93.5 A |
| 3,311,596 | 3/1967 | Berding et al................ | 260/85.5 M |
| 3,326,832 | 6/1967 | Rauschenbach et al...... | 260/45.75 C |
| 3,454,510 | 7/1969 | Newland et al.............. | 260/DIG. 43 |
| 3,554,996 | 1/1971 | Beck............................. | 260/93.5 A |
| 3,560,414 | 2/1971 | Miskel et al. ................. | 260/93.5 A |
| 3,592,792 | 7/1971 | Newland...................... | 260/DIG. 43 |
| 3,598,769 | 8/1971 | Hanton ......................... | 260/93.5 A |
| 3,637,538 | 1/1972 | Heald............................ | 260/93.5 A |

OTHER PUBLICATIONS

Waters et al., Mechanisms of Organic Compounds, published in Great Britain, 1964, pp. 6, 7 and 13.

*Primary Examiner*—Melvyn I. Marquis
*Assistant Examiner*—Eugene C. Rzucidlo
*Attorney, Agent, or Firm*—Sherman & Shalloway

[57] ABSTRACT

A photo-degradable styrene resin composition comprising a styrene resin and, incorporated therein, at least one salt of an organic carboxylic acid in an amount sufficient to exhibit a photo-degrading effect.

3 Claims, No Drawings

PHOTO-DEGRADABLE STYRENE RESIN COMPOSITION

This invention relates to styrene resin compositions which deteriorate and disintegrate readily under sun light or ultra-violet rays.

In general, when synthetic resins are left to stand under the influence of nature, they are not appreciably deteriorated by efflorescing actions such as oxidation and ozonization or by putrefaction by microorganisms. Accordingly, synthetic resin articles such as containers, bags, forms and other shaped articles still retain their original forms even after they are used and discarded, making their disposal very inconvenient and cumbersome. In the present "age of plastics", plastic articles are utilized in all fields of modern living, and disposal of such used plastic articles is presently a social problem.

For instance, disused plastic articles are collected together with other wastes from households and discarded in rivers or fields or reclaimed lands, but they retain their original forms for a very long time without undergoing deterioration, even after other waste materials have deteriorated and disintegrated. This phenomenon results in various social troubles such as industrial, sanitary and scenery-defiling problems. If waste articles of synthetic resins are collected separately from other waste articles and only synthetic resin articles are disposed of in some way or other, various difficulties arises. For instance, collection of such waste synthetic resin articles requires much labor and time. When they are burnt in incinerators black smokes or poisonous gases are inevitably generated. Further, some synthetic resins generate high temperatures when they are burnt, which results in extreme shortening of the life of incinerators.

As one solution to such problems, the specification of U.S. Pat. No. 3,454,510 proposes an agricultural film which has a controlled rate of deterioration, comprising a polyolefin, especially polyethylene, polypropylene or poly(butene-1), an opaquing agent and a prooxidant enhancing the photo-oxidation rate selected from the group consisting of acetyl acetonates of manganese, cobalt, chromium, iron, copper or vanadium, alkyl acetoacetates of manganese, cobalt, chromium, iron, nickel, zinc copper or vanadium, alkyl benzoylacetates of managanese, cobalt, chromium, iron, nickel, zinc, copper or vanadium, manganous or cobaltous stearates, and manganous or cobaltous oleates.

However, such polyethylene or polypropylene compositions may be deteriorated at the end, but it takes a very long time for these compositions to deteriorate and disintegrate completely. Resin compositions which may deteriorate and distintegrate in a much shorter period are desired in the field of throw-away resin articles or containers. Further, as polyolefin resin compositions are relatively soft and elastic, such compositions are not suitable for uses where regidity of the resin itself is required.

In polystyrene type resins which are used broadly as containers, packing materials, etc., no proposal has been made as to photo-degradation thereof. Accordingly, research has been conducted with a view to developing polystyrene compositions which may readily deteriorate and disintegrate in a short period and may be applied conveniently to throw-away uses without causing the abovementioned troubles, and have now arrived at the present invention.

Accordingly, an object of the present invention is to provide synthetic resin compositions and shaped articles prepared therefrom which will deteriorate and disintegrate readily under the influence of nature when they have been used and left outdoors and which do not bring about the above-mentioned troubles as to disposal thereof.

More specifically, the object of this invention is to provide styrene resin compositions which are allowed to deteriodate and disintegrate easily under sun light or ultra-violet rays due to the presence of specific organic transition metal compounds incorporated therein as photo-degrading agents.

In accordance with the present invention, a photo-degradable styrene resin composition is provided comprising a styrene resin and, incorporated therein, at least one organic transition metal compound in an amount sufficient to exhibit a photo-degrading effect.

By the term "organic transition metal compound" used herein are meant organic compounds containing a metal classified as the transition element according to the periodic law of elements. Particularly, salts formed from transition metals and organic carboxylic acids, and organic chelate compounds formed from transition metals and organic compounds capable of forming chelates compounds by the reaction with transition metals are preferred in the present invention. As such organic carboxylic acid formic acid, acetic acid, propionic acid, acrylic acid, butyric acid, methacrylic acid, naphthenic acid, benzoic acid, caprylic acid, lauric acid, oleic acid, stearic acid, oxalic acid, malonic acid, maleic acid, fumaric acid, glutaric acid, itaconic acid, adipic acid, pimelic acid, phthalic acid and sebasic acid may be exemplified. As the organic compound capable of forming a chelate by the reaction with a tansition metal, acetylacetone and alkyl acetoacetates expressed by the formula $CH_3CO.CH_2COOR$ in which R stands for an alkyl group may be exemplified. Preferable transition metals include iron, manganese, cobalt and copper.

Transition metals have generally variable valency. In the organic transition metal compound to be used in the present invention the valency of the transition metal is not critical, and it may take any valency that can be possessed by it. For instance, iron or cobalt is generally di- or tri-valent, manganese is di-, tri- or hepta-valent, and copper is mono- or di-valent. In this invention organic compounds containing these metals may be preferably used irrespective of their valency.

Thus, preferable organic transition metal compounds to be used in the present invention include iron formate, iron acetate, iron stearate, iron oleate, iron naphthenate, iron bis- or tris-acethylacetonate, iron bis- or tris-alkyl acetoacetates, cobalt acetate, cobalt stearate, cobalt oleate, cobalt naphthenate, cobalt bis- or tris-acetylacetonate, cobalt bis- or tris-alkyl acetoacetates, manganese acetate, manganese oxalate, manganese stearate, manganese oleate, manganese naphthenate, manganese bis- or tris-acetylacetonate, manganese bis- or tris-alkyl acetoacetates, copper acetate, copper oleate, copper stearate, copper eleate, copper naphthenate, copper bis-acetylacetonate, copper bis-alkyl acetoacetates and the like.

These organic transition metal compounds may be used singly or in admixtures of two or more of such compounds. The amount of the organic transition metal used is at least 0.001 part by weight per 100 parts by weight of the styrene resin. The upper limit of the amount of the organic transition metal compound used is not particularly critical, but in view of the physical properties and costs of the resulting styrene type resin compositions, it is preferred that the organic transition metal compound is incorporated in an amount of from 0.005 to 10 parts by weight, especially 0.01 to 10 parts by weight, per 100 parts by weight of the styrene resin.

The resins which are rendered easily photo-degradable by incorporation of such organic transition metal compound are styrene type synthetic resins. The "styrene type synthetic resins" used herein include homopolymers of styrene and its derivatives, and copolymers of two or more of styrene and its derivatives and copolymers of styrene or its derivative with at most 50 mole % of a comonomer copolymerizable therewith. As the styrene derivative α-methylstyrene, methylvinylbenzene, ethylvinylbenzene, α-chlorostyrene, 4-chlorostyrene, 2,4-dichlorostyrene, 2,4,6-trichlorostyrene and the like may be exemplified.

As the comonomer copolymerizable with styrene or its derivative, acrylic monomers such as methyl acrylate, ethyl acrylate, butyl acrylate, acrylic acid, methyl methacrylate, methacrylic acid and acrylonitrile; diene monomers such as butadiene and isoprene; and maleic acid, maleic anhydride, maleic acid esters, itaconic acid and itaconic acid esters, etc. may be mentioned.

Examples of the copolymer applicable to this invention are a styrene-α-methylstyrene copolymer, a styrene-methyl methacrylate copolymer, a styrene-acrylonitrile copolymer, a styrene-butadiene copolymer, an α-methylstyrene-methyl methacrylate copolymer, a styrene-methyl methacrylatebutadiene copolymer and the like.

These copolymers may contain at most 50 mole %, preferably at most 30 mole %, particularly preferably at most 20 mole %, of the units of such comonomer copolymerizable with styrene or its derivative.

Styrene resins preferably used in this invention include a homopolymer of styrene and a copolymer of styrene with a diene monomer such as butadiene and isoprene. In the case of a copolymer of styrene with a diene monomer, as the content of the diene monomer increases, a better photo-degrading effect can be attained coupled with poor weatherability inherent to the styrene-diene copolymer. Thus, at a higher diene monomer content, the degree of the photo-degradation becomes higher in the copolymer. However, the increase of the content of the diene monomer results in reduction of mechanical properties inherent to the polymer, such as rigidity. Accordingly in the composition of the present invention, it is desired to use a styrene-diene copolymer in which the diene monomer content is in the range of from 0.1 to 10 % by weight.

In preparing the photo-degradable styrene resin composition of the present invention, any method can be adopted, as long as it can disperse the photo-degrading agent uniformly throughout the syrene resin. For instance, the composition of the present invention may be prepared merely by adding the photo-degrading agent to a styrene polymer. It is also possible to adopt a method comprising adding the photo-degrading agent to a styrene type monomer optionally together with other copolymerizable comonomer and then subjecting the blend to polymerization conditions. In any case, it is preferable to disperse the photo-degrading agent uniformly throughout the styrené type resin. For attaining such uniform dispersion state customary methods such as a method comprising dissolving or suspending the photo-degrading agent homogeneously in the monomer system and then conducting the polymerization, a method comprising adding the photo-degrading agent to a styrene type polymer and then mixing them to form a homogeneous blend by means of a blender or mixer, a method comprising forming a resin composition by kneading a molten mixture of a styrene type polymer with the photo-degrading agent with use of a pelletizer or the like, and a method comprising melting a mixture of a styrene type polymer with the photo-degrading agent, mixing the melt to form a homogeneous resin composition and shaping it to an article having a desired configuration can be adopted.

It has been found that when at least one organic bromine compound which contains at least 1 carbon atom to which 2 or more bromine atoms are bonded is incorporated as a photo-degrading accelerator into the styrene resin composition comprising a styrene type resin and an organic transition metal compound, the photo-degradable and photo-disintegrable properties of the composition are further improved as compared with the styrene resin composition comprising an organic transition metal compound alone, and such composition is allowed to deteriorate and disintegrate under sun light or ultra-violet rays in a shorter period of time.

Preferable organic bromine compounds are brominated aliphatic hydrocarbons, especially brominated hydrocarbons having 1 to 10 carbon atoms. As such bromine compound dibromomethane, 1,1-dibromoethane, 2,2-dibromobutane, tribromomethane, tetrabromomethane, 1,1,2,2-tetrabromoethane, hexabromoethane, 2,2-dibromopropane, 1,1,2-tribromoethane, 1,1,1,2-tetrabromoethane, 3,3-dibromopentane, 2,2-dibromo-4-methylpentane, 3,3-dibromoheptane, 4,4-dibromopentane and 2,2-dibromoctane may be exemplified. The use of 1,1,2,2-tetrabromoethane is especially preferred.

These bromine compounds may be used either singly or in combination. The amount of the organic bromine compound used is at least 0.01 part by weight, preferably 0.01–10 parts by weight, especially preferably 0.1–5 parts by weight, per 100 parts by weight of the styrene type resin. It is preferred that the total amount of the organic transition metal compound and the organic bromine compound to be added to the styrene type resin is in the range of 0.05 to 10 parts by weight, especially 0.5 to 5 parts by weight per 100 parts by weight of the styrene type resin and that the amount of the organic transition metal compound is greater than that of the organic bromine compound.

Some of organic bromine compounds utilizable as the photo-degrading accelerator in the present invention have an offensive smell. It is preferable to avoid incorporation of such bromine compounds when it is intended to prepare resin compositions for uses where such smell is undesired. Since organic bromine compounds render resin products difficultly combustive, they are conveniently and preferable utilized for preparation of resin products for uses requiring difficult combustibility.

The organic bromine compound may be added by methods described with respect to the photo-degrading agent to a polymeric styrene type resin or to a monomer styrene which will be polymerized to a styrene type resin. The photo-degrading accelerator may be added either coincidentally with the photo-degrading agent, or before or after the addition of the photo-degrading agent. In any case, it is desired that the photo-degrading accelerator as well as the photo-degrading agent is dispersed homogeneously throughout the resin.

It will be readily understood that ordinary additives to a styrene type resin, such as stabilizers, lubricants, fillers, pigments, high molecular weight substances, etc. can be incorporated in the styrene type resin composition of the present invention according to need. Further, it is also possible to incorporate ordinary forming agents or foam-generating substances into the composition of the present invention. In this case, a foam having a multicellular structure can be formed from the sytrene type resin composition of the present invention.

The styrene resin composition of this invention may be shaped into articles of a desired size and configuration such as plates, sheets, films, tubes and various containers by conventional molding techniques. For instance, the composition is blended and kneaded by means of a mixing roll, a Bumbury mixer, an extrusion kneader, etc., and molded by means of an injection molder, an extruder, a molding press, a calender roll, etc.

Styrene resins usually used as plastics in various fields have a degree of polymerization ranging from about 800 to about 5000. When the degree of polymerization is reduced in such styrene resins to about 500 or less by a natural or artifical deteriorative action, the resins become fragile and are readily disintegrated. When the styrene resin composition of this invention is left outdoors and exposed to sun light or ultra-violet rays, the polymer component of the resin composition is deteriorated by an action of the photo-degrading agent and photo-degrading accelerator incorporated in the resin and the degree of polymerization is therefore reduced. Although the degree of deterioration varies depending on the kind and degree of polymerization of the polymer component, the amounts of the photo-degrading agent and the photo-degrading accelerator, used the season and other factors, when the composition of the present invention is left outdoors for a period of about 1 week to several months, preferably 1-5 months, the composition molded to have a definite shape is deteriorated to such a degree that the spontaneous disintegration is allowed to occur in the composition.

The reason why the styrene type resin composition of the present invention is allowed to deteriorate and disintegrate readily under exposure to sun light or ultra-violet rays has not been completely elucidated, but it may be construed that the resin composition excited by the exposure to sun light or ultra-violet rays reacts with oxygen in air to form a hydro-peroxide, which in turn undergoes the radical decomposition by the organic transition metal compound, and thus the reduction of the molecular weight is brought about by one type of chain reaction. It is also construed that the organic bromine compounds promote or accelerate the decomposing action of the organic transition metal compound.

Molded or shaped articles from the composition of the present invention are readily deteriorated and disintegrated under exposure to sun light or ultra-violet rays. Especially when the styrene resin composition of this invention is used for throw-away articles, unlike conventional synthetic resin products, they do not damage natural environments, and labor and time required for collection and incineration thereof can be omitted.

The present invention will now be detailed by referring to Examples, but it must be noted that the scope of the invention is not at all limited by these Examples.

EXAMPLE 1

One gram (1 g) of polystyrene having an average degree of polymerization of about 1300 was dissolved in 10 ml of toluene, and 10 mg of cobalt naphthenate dissolved in kerosene were added to the solution. The mixture was agitated sufficiently and cast on a Petri dish and the solvent was evaporated to form a film of a thickness of 0.2 mm.

In the same manner as above, films were prepared by employing organic transition metal compounds indicated in Table 1 below.

For comparison, a film of a thickness of 0.2 mm was prepared in the same manner without addition of any organic transition metal compound from polystyrene having an average degree of polymerization of about 1300.

Each of these films was subjected to irradiation of a 400 watt high pressure mercury lamp disposed 30 cm from the sample film. The change in the degree of polymerization brought about by conducting the irradiation for a predetermined period of time (20 hours or 100 hours after initiation of the irradiation) was examined. Results are shown in Table 1.

Table 1

| Kind of additive | before irradiation | Degree of Polymerization | |
|---|---|---|---|
| | | after 20 hours irradiation | after 100 hours irradiation |
| cobalt naphthenate | about 1300 | 440 | 370 |
| manganes naphthenate | about 1300 | 740 | 440 |
| iron naphthenate | about 1300 | 620 | 420 |
| cobalt caprylate | about 1300 | 380 | 360 |
| copper caprylate | about 1300 | 500 | 350 |
| cobalt acethylacetonate | about 1300 | 690 | 430 |
| iron acetylacetonate | about 1300 | 700 | 500 |
| copper acetylacetonate | about 1300 | 900 | 530 |
| blank | about 1300 | 1060 | 980 |

As is seen from the results shown in Table 1, in each of the compositions according to the present invention, the degree of polymerization was greatly reduced as compared with the blank composition free of a photo-degrading agent. This fact illustrates that in the composition of the present invention the degradation is allowed to advance under ultra-violet rays.

Each of the sample films prepared from the compositions of the present invention become very fragile after 100 hours irradiation of the high pressure mercury lamp and it was crumbled away only by picking it with fingers. However, in the film from the blank composition free of a photo-degrading agent such fragility was not observed.

EXAMPLE 2

Films of thickness of 0.2 mm were prepared in the same manner as in Example 1 while varying the amount of cobalt naphthenate as indicated in Table 2 given below. The films were subjected to irradiation of a high pressure mercury lamp in the same manner as in Example 1, and the change of the degree of polymerization was determined after a predetermined period of time (20 hours or 100 hours). Results are shown in Table 2.

Table 2

| Amount incorporated of cobalt naphthenate (part by weight per 100 parts by weight of polystyrene) | Degree of polymerization | | |
|---|---|---|---|
| | before irradiation | after 20 hours irradiation | after 100 hours irradiation |
| 0.01 | about 1300 | 1010 | 690 |
| 0.05 | about 1300 | 920 | 500 |
| 0.1 | about 1300 | 750 | 460 |
| 0.3 | about 1300 | 630 | 430 |
| 0.5 | about 1300 | 480 | 380 |
| blank | about 1300 | 1060 | 980 |

From the results shown in Table 2, it is seen that the photo-degrading property of the syrene resin composition is accelerated in proportion to the amount of the photo-degrading agent incorporated therein and that at the incorporation ratio of about 0.01 part of the photo-degrading agent per 100 parts by weight of polystyrene a satisfactory photo-degrading effect can be attained.

EXAMPLE 3

A mixture of 10 g of a styrene-butadiene copolymer of a butadiene content of 0.83 % by weight and 0.05 g of iron tris-acetylacetonate was dissolved in 100 g of toluene, and the solution was formed into a film of a thickness of 0.1 mm by the casting method. The degree of polymerization of the styrene-butadiene copolymer contained in the film was 1280.

Films of a thickness of 0.1 mm were prepared in the same manner as above by employing 0.01 g of an iron naphthenate solution of an iron content of 7 % by weight, 0.05 g of copper acetylacetonate or 0.01 g of a cobalt naphthenate solution of a cobalt content of 6 % by weight instead of the iron tris-acetylacetonate.

For comparison, a film of a thickness of 0.1 mm was prepared in the same manner from the same styrene-butadiene copolymer without addition of any photo-degrading agent.

Each of these films was exposed under irradiation of a 400 watt high pressure mercury lamp disposed 30 cm from the film. The change in the degree of polymerization after the irradiation was examined. Results are shown in Table 3 given below.

Table 3

| Kind of additive | Amount of additive (part by weight per 100 parts by weight of polymer) | Degree of polymerization | |
|---|---|---|---|
| | | before irradiation | after 40 hours irradiation |
| iron tris-acetylacetonate | 0.5 | about 1280 | 530 |
| iron naphthenate solution | 0.1 | about 1280 | 420 |
| copper bis-acetylacetonate | 0.5 | about 1280 | 540 |
| cobalt naphthenate solution | 0.1 | about 1280 | 410 |
| blank | — | about 1280 | 780 |

EXAMPLE 4

A blend of 10 g of polystyrene of an average degree of polymerization of about 1300 with 0.1 g of 1,1,2,2-tetrabromoethane and 0.01 g of cobalt tris-acetylacetonate was shaped into a film of a thickness of 0.2 mm in the same manner as in Example 1. Then, the film was subjected to irradiation of a high pessure mercury lamp for 100 hours in the same manner as in Example 1. The average degree of polymerization was thus reduced to 395, and the sample film became very fragile and was easily crumbled away.

EXAMPLE 5

A blend of 10 g of a styrene-butadiene copolymer of a butadiene content of 1.85 % by weight having an average degree of polymerization of 3590 with 0.01 g of iron tris-acetylacetonate and 0.1 g of tetrabromoethane was dissolved in 100 g of toluene, and the solution was shaped into a film of a thickness of 0.1 mm by the casting method. When the film was exposed to irradiation of a high pressure mercury lamp for 32 hours in the same manner as in Example 1, the degree of polymerization was reduced to 550 and the film was readily crumbled away.

For comparison, a film of a thickness of 0.1 mm was prepared from the same styrene-butadiene copolymer free of a photo-degrading agent and exposed to irradiation of a high pressure mercury lamp for 32 hours in the same manner as above. The degree of polymerization was reduced to 1400.

EXAMPLE 6

A blend of 10 g of styrene-isoprene copolymer of an isoprene content of 1.97 % by weight having an average degree of polymerization of 1110 with 0.01 g of cobalt naphthenate was dissolved in 100 g of toluene, and the solution was cast into a film of a thickness of 0.1 mm. The film was subjected for 18 hours to irradiation of a 400 watt high pressure mercury lamp disposed 15 cm apart from the film. Thus the degree of polymerization was reduced to 270.

When a film of a thickness of 0.1 mm prepared from the same styrene-isoprene copolymer without addition of cobalt naphthenate was subjected for 18 hours to irradiation of a 400 watt high pressure mercury lamp in the same manner as above, the degree of polymerization was reduced to 410.

EXAMPLE 7

A blend of 3 g of polystyrene having an average degree of polymerization of 1300 with 0.02 g of cobalt tris-acetylacetonate and 0.02 g of iron tris-acetylacetonate was formed into a film of a thickness of 0.1 mm by the casting method. The film was subjected to irradiation of a 400 watt high pressure mercury lamp in the same manner as in Example 1. After 20 hours of irradiation, the degree of polymerization was reduced to 650. When a film of a thickness of 0.1 mm prepared from the above polystyrene without addition of cobalt tris-acetylacetonate or iron tris-acetylacetonate was subjected for 20 hours to irradiation of a mercury lamp in the same manner as above, the degree of polymerization was 1060.

EXAMPLE 8

A 2-liter autoclave was charged with 500 g of beads of polystyrene having an average degree of polymerization of 1130, 5 g of iron naphthenate, 5 g of dichloroethane and 700 g of a 0.5% aqueous solution of polyvinyl alcohol, and 100 g of butane were introduced thereinto under pressure. The charges were maintained at 50°C. for 5 hours under agitation, and then the temperature was lowered to 20°C. and the resulting blend was withdrawn from the autoclave. The so treated polystyrene beads were allowed to stand for 3 days in a refrigerator maintained at 10°C. Then, the beads were charged into a foaming molder and heated by steam to effect the foaming. As a result a polystyrene foam having an apparent density of 0.017 was obtained. The foam was cut into sheets of a thickness of 5 mm. When the sample sheet was exposed for 100 hours to irradiation of a 400 watt high pressure mercury lamp disposed 30 cm from the sheet, the portion of the sheet from the irradiated surface to the interior of a depth of about 3 mm became very fragile and was crumbled away in fine powder only by picking it by fingers.

When a polystyrene foam sheet of an apparent density of 0.016 prepared in the same manner as above without addition of iron naphthenate was subjected for 200 hours to irradiation of a 400 watt high pressure mercury lamp in the same manner as above, such deterioration as described above was caused only in a portion of the sheet from the irradiated surface to the interior of a depth of less than 1 mm.

EXAMPLE 9

When a film of a thickness of 0.1 mm prepared from a blend of 10 g of polystyrene of a degree of polymerization of 1130 with 0.2 g of iron tris-methylacetoacetate by the casting method was subjected for 6 hours to irradiation of a 400 watt high pressure mercury lamp disposed 15 cm from the film, the degree of polymerization was reduced to 690.

When a film of a thickness of 0.1 mm prepared in the same manner as above without employing iron tris-methylacetoacetate was exposed to irradiation of a mercury lamp under the same conditions as above, the degree of polymerization of the polystyrene was 1050.

EXAMPLE 10

A film of a thickness of 0.1 mm was prepared from a blend of 10 g of polystyrene having a degree of polymerization of 1130 with 0.01 g of cobalt tris-acetylacetonate by the casting method with use of toluene.

A blend of 10 g of polyethylene having a melt index of 4.0 with 0.01 g of cobalt tris-acetylacetonate was dissolved in xylene, and the solution was formed into a film of a thickness of 0.1 mm by the casting method.

Each of these films was subjected to irradiation of a 400 watt high pressure mercury lamp disposed 30 from the film. The irradiation was effected at 35°C. The change in the tensile strength and elongation of the film were examined after the irradiation was conducted for a period of time indicated in Table 4 given below. The determination was effected under the following conditions:

| | |
|---|---|
| Tensile speed: | 100 mm/min |
| Temperature: | 20 ± 1°C. |
| Relative humidity: | 65 ± 5 % |

Results are shown in Table 4.

Table 4

| Irradiation Time (hours) | Tensile Strength (kg/mm$_2$) | | Elongation (%) | |
|---|---|---|---|---|
| | polystyrene film | polyethylene film | polyethylene film | polyethylene film |
| 0 | 2.17 | 1.15 | 6.0 | 556 |
| 10 | 1.85 | 1.20 | 3.5 | 410 |
| 70 | measurement impossible because of film breakage | 1.45 | measurement impossible | 154 |
| 140 | — | 1.16 | — | 66 |

As is seen from the results shown in Table 4, the change in physical properties caused by the irradiation of a mercury lamp is much greater in the polystyrene composition of the present invention than in the polyethylene composition when the irradiation is effected for the same period of time. Namely the deterioration rate under exposure of ultra-violet rays is much higher in the polystyrene composition of the present invention than in the polyethylene composition.

What we claim is:

1. A photo-degradable styrene resin composition comprising a styrene-diene copolymer of a diene monomer content of from 0.1 to 10 % by weight, wherein said diene is selected from the group consisting of butadiene and isoprene, and, incorporated therein, at least 0.001 parts by weight, per 100 parts by weight of said styrene resin of at least one transition metal salt of an organic carboxylic acid, said transition metal being selected from the group consisting of iron, cobalt, manganese and copper and further including, as a photo-degrading accelerator, at least 0.01 parts by weight, per 100 parts by weight of said styrene resin of at least one brominated aliphatic hydrocarbon which contains at least one carbon atom to which at least two bromine atoms are bonded.

2. The composition of claim 1 wherein said brominated aliphatic hydrocarbon compound is present in the composition in an amount of from 0.01 to 10 parts by weight per 100 parts by weight of the styrene resin.

3. The composition of claim 1 wherein said brominated aliphatic hydrocarbon is a member selected from the group consisting of dibromomethane, 1,1-dibromoethane, 2,2-dibromobutane, tribromomethane, tetrabromomethane, 1,1,2,2-tetrabromoethane, hexabromoethane, 2,2-dibromopropane, 1,1,2-tribromoethane, 1,1,2-tetrabromoethane, 3,3-dibromopentane, 2,2-dibromo-4-methylpentane, 3,3-dibromoheptane, 4,4-dibromopentane and 2,2-dibromoctane.

* * * * *